United States Patent [19]

Acda et al.

[11] 4,065,243

[45] Dec. 27, 1977

[54] APPARATUS FOR FORMING A THICKENED BELL END ON THERMOPLASTIC PIPE

[75] Inventors: Petrus Marinus Acda; Jacob Karreman, both of Enkhuizen, Netherlands

[73] Assignee: Polva Nederland B.V., Enkhuizen, Netherlands

[21] Appl. No.: 730,362

[22] Filed: Oct. 7, 1976

Related U.S. Application Data

[62] Division of Ser. No. 607,770, Aug. 26, 1975, Pat. No. 4,006,757.

[30] Foreign Application Priority Data

Feb. 28, 1975 Netherlands .......................... 7502374

[51] Int. Cl.² .............................................. B29C 1/12
[52] U.S. Cl. ........................ 425/393; 425/DIG. 218; 264/322
[58] Field of Search ............... 425/392, 393, 384, 397, 425/DIG. 218; 264/95, 322

[56] References Cited

U.S. PATENT DOCUMENTS

| 3,205,535 | 9/1965 | Niessner et al. ................ 425/393 X |
| 3,360,826 | 1/1968 | Lorang ............................ 425/393 X |
| 3,432,887 | 3/1969 | Poux et al. ............................ 425/387 |
| 3,893,794 | 7/1975 | Acda .................................... 425/393 |
| 3,986,810 | 10/1976 | LaBranche et al. ................ 425/393 |

*Primary Examiner*—Robert L. Spicer, Jr.
*Attorney, Agent, or Firm*—Frank R. Trifari; David R. Treacy

[57] ABSTRACT

An apparatus for forming a bell end having a thickened portion on a pipe composed of thermoplastic material, in which an annular shaping space is established between a shaping sleeve and a mandril having an elastic shaping ring, the height of the shaping space increasing along transition portions of the surfaces of the sleeve and the mandril to a region defining a sealing chamber and then decreasing again.

4 Claims, 4 Drawing Figures

APPARATUS FOR FORMING A THICKENED BELL END ON THERMOPLASTIC PIPE

This is a division of application Ser. No. 607,770, filed Aug. 26, 1975 now U.S. Pat. No. 4,006,757 issued Feb. 8, 1977.

BACKGROUND OF THE INVENTION

1. Field of the Invention

The invention relates to shaping a bell end on a pipe of thermoplastic material by shaping the preheated pipe end on a shaping mandril, and upsetting the pipe end so that a bell end is formed having an annular sealing chamber. The inner diameter of the bell end increases in a series of steps from the diameter of the pipe to a maximum value, then decreases to the end of the bell, the wall thickness of the bell end being at least equal to the wall thickness of the pipe. Part of the inner wall of the sealing chamber serves as a sealing face.

2. Description of the Prior Art

An apparatus for forming this kind of bell end is already known from U.S. Pat. No. 3,893,794. Using this known apparatus, the upsetting operation compensates for the reduction of the wall thickness of the bell caused by the radial enlargement, so that the provision of a reinforcement sleeve on the end of the pipe or the thickening in advance of the pipe end in a separate operation can be dispensed with. With this known apparatus, the wall thickness will be substantially the same over the entire length of the bell end; because the wall stress caused by the pressure of material flowing in the pipe is a function of the inner diameter of the bell end, an irregular stress distribution will occur in the bell end wall if the wall thickness is not varied along with the diameter. Because a constant bell end wall thickness would be calculated for the highest stress occurring, given bell end portions, where this maximum stress does not occur, will be overproportioned.

SUMMARY OF THE INVENTION

An object of the invention is to provide an apparatus for easily and automatically forming a bell end in thermoplastic pipe, the bell end being shaped with a wall thickness distribution such that, when the bell end is loaded by fluid pressure in the pipe, the stress in the bell end wall is substantially constant over the entire length of the bell end, and the bell end has a pressure resistance which at least equals that of the pipe from which the bell was formed.

According to the invention, the wall thickness of the bell end increases from the thickness of the basic pipe wall to a maximum wall thickness at the bell end portion comprising the sealing face.

As a result, a bell end can be shaped which has an optimum wall thickness distribution, the very critical upsetting being limited to the necessary minimum; superfluous upsetting of given bell end portions is avoided, and all inherent risks such as creasing are thus minimized.

The maximum wall thickness will occur at the bell end portion subjected to the maximum load, notably the portion of the bell end whose inner wall acts, in cooperation with a sealing ring to be inserted, as a sealing face. The relevent bell end portion is loaded by the pressure of fluid flowing through the pipe as well as by the force of the compressed sealing ring. It has been empirically demonstrated that the maximum wall thickness ensuring adequate pressure resistance of the bell end can be determined by means of the formula:

$$S = (P \times D)(2\delta - P)$$

wherein:
- $S$ = wall thickness in cm
- $P$ = nominal pressure in kg/cm$^2$
- $D$ = inner diameter in cm
- $\delta$ = permissible stress in kg/cm$^2$.

The wall thickness of the various bell end portions exposed to pressure is directly proportional to the inner diameter of these bell end portions. Because according to this method overproportioning of given bell end portions is prevented, a bell end having an optimum pressure resistance is obtained using a minimum quantity of material.

In the preferred embodiment according to the invention the wall thickness of the bell end decreases again from the portion of maximum wall thickness to the end of the bell end. Overproportioning of the bell end is thus prevented and a further material saving is realized.

In a further preferred embodiment yet the maximum wall thickness if provided at a bell end portion which has an inner diameter which is between the maximum and minimum inner diameters, the bell end portion having the maximum inner diameter being connected to the maximum thickness portion by a conical transition portion enclosing an angle of inclination less than 45° from the center line of the bell end. This produces a bell end whose sealing chamber has varying diameter steps. This sealing chamber serves to accommodate a special sealing ring, i.e. a ring having a sealing lip; the portion of the sealing chamber of smaller diameter serves as a sealing face, the portion of larger inner diameter serving as the locating portion. Optimum sealing can thus be obtained from a sealing ring which is optimally located. Also, the portion of maximum wall thickness, whose inner wall also serves as the sealing face, is the most vulnerable part of the pipe; this bell end portion is protected against damage during transport, storage and assembly, by the portion of maximum inner and outer diameter.

A preferred apparatus embodying the invention comprises a shaping mandril having a metal core portion and an elastic shaping ring, a shaping sleeve, a pipe clamp and an upsetting member, the shaping mandril, shaping sleeve and pipe clamp being displaceable relative to each other, the shaping mandril and the shaping sleeve bounding an annular shaping space, the outer diameter of the shaping mandril and the inner diameter of the shaping sleeve first step-wise increasing, viewed from the front end of the shaping mandril facing the pipe clamp, via conical transition portions, to a maximum value at the area of the shaping ring, and subsequently step-wise decreasing again; according to the invention, the height of the shaping space increases from the front end of the shaping mandril to a maximum value at the area of the shaping ring. Using a mandril with the described annular shaping space, bell end of varying wall thickness can be shaped in a simple, accurate and reproducible manner, without separate preparation of the pipe end to be treated being required.

In a preferred embodiment of the apparatus according to the invention, the height of the shaping space decreases again from the portion of maximum height in the direction of the rear end of the shaping mandril. Once the shaping mandril and the shaping sleeve are in the operating position, the ultimate shaping space has been formed and the profile and the wall thickness distribution of the bell end to be shaped have been determined, without a further relative displacement of shaping mandril and/or shaping sleeve being required.

According to a further embodiment of the invention, the upsetting operation is performed exclusively in the direction of the end of the bell end, the successive bell end portions being successively upset in the direction from the pipe side towards the end of the bell end, the upsetting of the wall of the sealing chamber being effected via conical transition portions, the angle of inclination thereof with respect to the center line of the bell end being smaller than 45° and larger than 120°, respectively. It is thus possible to perform the upsetting operation in a controlled and reproducible manner in a single direction, without irregularities such as creases occurring. Because the upsetting operation takes place in the direction of the end of the bell end, moreover, a device having a comparatively simple control can be used. A uniform wall thickness is also realized over the circumference of the bell end, in spite of possible irregularities in the wall thickness of the original pipe in the circumferential direction. Differences in wall thickness of individual pipes with respect to each other are also compensated for. Irregularities are generally eliminated by the upsetting process, resulting in improved proportioning of the sealing chamber and particularly of the sealing face.

In a further preferred apparatus embodiment of the invention, the shaping ring comprises two cylindrical surfaces, the diameter of the cylindrical surface directed towards the front end of the shaping mandril being smaller than the diameter of the other cylindrical surface and larger than the diameter of the adjoining part of the core portion, the shaping ring between the two cylindrical surfaces having a conical transition portion which encloses an angle of inclination of less than 45° with the center line of the shaping mandril. Using this device, a bell end can be shaped whose bell end portion of maximum wall thickness, the inner wall thereof serving as the sealing face, is not situated in the portion of the bell end of maximum outer and inner diameter.

In another preferred embodiment yet the height of the shaping space at the area of the cylindrical surface of the shaping ring directed towards the front end of the shaping mandril exceeds the height of the shaping space at the area of the smallest cylindrical portion on the front end of the shaping mandril by 30% or less. Shapes and dimensions which are optimum for ease of upsetting usually are not optimum for proper sealing. With this preferred embodiment, the largest wall thickness with a smooth inner surface is obtained for the bell end portion comprising the sealing face, so that proper sealing is enabled. It has been found that the upsetting process becomes critical if the wall thickness is increased by more than 30%.

In a further preferred embodiment, the upsetting member is formed by an annular radial abutment face on the rear of the shaping mandril. Because of this structurally very simple step, making a separate, displaceable upsetting member superfluous, the upsetting operation can be initiated as soon as the preheated pipe end contacts the abutment face.

In yet another preferred embodiment the apparatus comprises a cooling ring on the front end of the shaping sleeve directed towards the pipe clamp. Due to the cooling, the pipe portion adjoining the bell end is cooled so as to prevent creases, ridges or grooves on the pipe at the area of the end face of the shaping sleeve facing the pipe clamp.

BRIEF DESCRIPTION OF THE DRAWING

The invention will be described in detail hereinafter with reference to the drawing, in which.

DESCRIPTION OF THE PREFERRED EMBODIMENT

Figure 1:
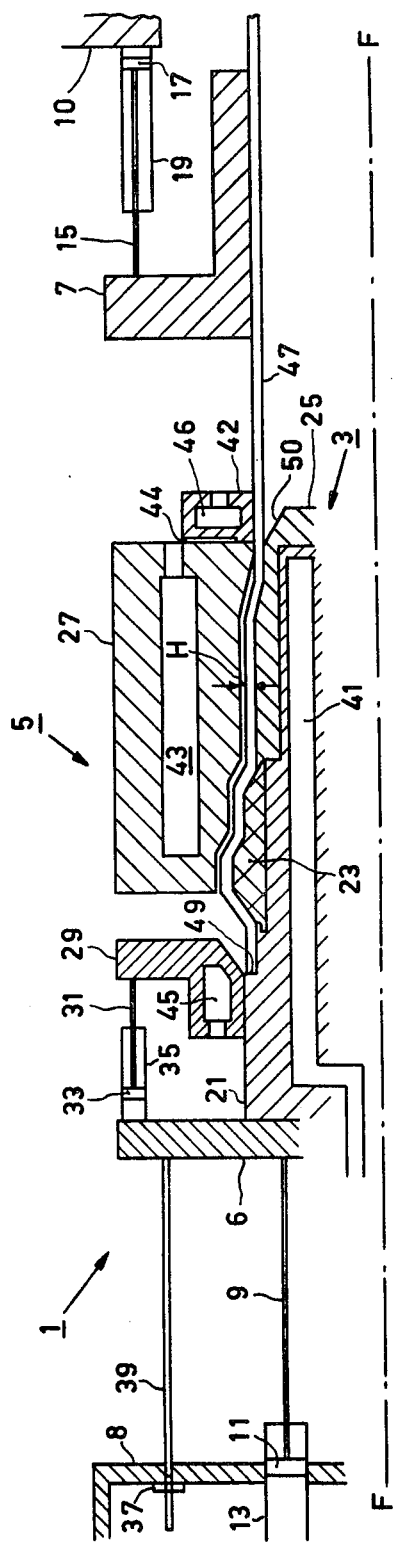
FIG. 1 is a longitudinal sectional view of an apparatus according to the invention, together with a pipe to be treated.

Because the apparatus is of a rotation-symmetrical construction, for simplicity the drawing only shows the upper half. The apparatus 1 mainly comprises a multipart cylindrical shaping mandril 3, a two-part shaping sleeve 5, and a pipe clamp 7, having an inner diameter which substantially equals the outer diameter of the pipe to be treated. The shaping mandril 3 and the pipe clamp 7 are slidably journalled on a frame, portions 8 and 10 of the frame being shown. The shaping mandril 3 is connected by a vertical plate 6 and a piston rod 9 to a piston 11 of a hydraulic cylinder 13 on the frame portion 8. The pipe clamp 7 is longitudinally divided into two pivotably connected shells and is connected, by way of a piston rod 15, to the piston 17 of a hydraulic cylinder 19 on the frame portion 10. The shaping mandril 3 is composed of a metal core portion 21 and a shaping ring 23 of elastically deformable material which is slidable on the core portion 21; a sleeve-shaped end portion 25, forming part of the core portion 21, is slidable on the front end of the core portion 21 which faces the pipe clamp 7, and can be locked in known manner on the core portion 21 by hydraulic means not shown. The shaping sleeve 5 comprises a shaping cylinder 27 which is longitudinally divided into two radially displaceable half shells, and also a closing ring 29 which is slidable on the core portion 21. The closing ring 29 is connected, by way of a piston rod 31, to the piston 33 of an hydraulic cylinder 36 on the plate 6. The displacement of the shaping mandril in the direction of the pipe clamp is limited by an adjustable nut 37 on a rod 39 secured on the plate 6. The core portion 21, the shaping cylinder 27 and the ring 29 are provided with chambers 41, 43 and 45, respectively, for the circulation of heating and cooling mediums. A gap 44 partly separates the cooling ring 42 from the shaping cylinder 27. The cooling ring 42 is also split into two shells, and comprises a cooling chamber 46. The inner diameter of the cooling ring 42 substantially equals the outer diameter of the pipe to be treated.

For shaping a bell end on the end of a pipe 47, the pipe end is preheated to a temperature such that the pipe material is deformable. Meanwhile, the shaping mandril 3, the shaping cylinder 27 and the ring 29 are also heated by circulation of a heating medium, such as steam or hot oil, in the chambers 41, 43 and 45, while the cooling ring 42 is cooled by circulation of a cooling medium in the cooling chamber 46. The shaping mandril 3 is then situated in a retracted position (not shown) at the left in the drawing. The two half shells of the shaping cylinder 27 and of the cooling ring 42 are radially displaced from each other; the two shells of the pipe clamp 7 are also opened. The pipe 47 is arranged in the pipe clamp 7 such that the end of the pipe projects a predetermined distance from the pipe clamp. By closing the clamp the pipe is positioned in the axial and radial direction. Subsequently, the two half shells of the shaping cylinder 27 and of the cooling ring 42 are radially displaced towards each other. By means of the hydraulic cylinder 13, the shaping mandril 3 is slid into the heated pipe end as far as the position shown in FIG. 1. The introduction of the shaping mandril is facilitated by a conical face 50 on the end portion 25 of the shaping mandril. The shaping ring 23 is then secured on the core portion 21 by means of the end portion 25. The preheated, plastically deformable pipe end slides over the outer circumference of the shaping mandril during the relative displacement of shaping mandril and pipe, and assumes the profile of the shaping mandril, the pipe end thus being pre-shaped. This situation is shown in FIG. 1. The end face of the pipe end just engages an annular abutment face 49 on the rear of the shaping mandril. Finally, the ring 29 is displaced in the direction of the shaping cylinder 27 by the piston 33 as far as the position shown in FIG. 2. In this position a shaping space 51 is formed by the outer circumferences of the shaping mandril 3 and the inner circumference of the shaping sleeve 5, the height H of the shaping space first increasing, from the front end of the shaping mandril, to a maximum value, and subsequently decreasing again, the minimum height being at least equal to the wall thickness S of the pipe 47.

The shaping space 51 is fully filled by an upsetting operation, so that a bell end is formed whose wall thickness W, in accordance with the height H of the shaping space 51 and viewed in the direction of the end of the bell end, first increases to a maximum value and subsequently decreases again. The upsetting operation is performed by displacing the pipe clamp 7 with the pipe 47 in the direction of the shaping mandril. The shaping space is then filled from the front end of the shaping mandril to the rear end, successive portions of the pre-shaped pipe end of different diameter being successively upset.

Figure 3:
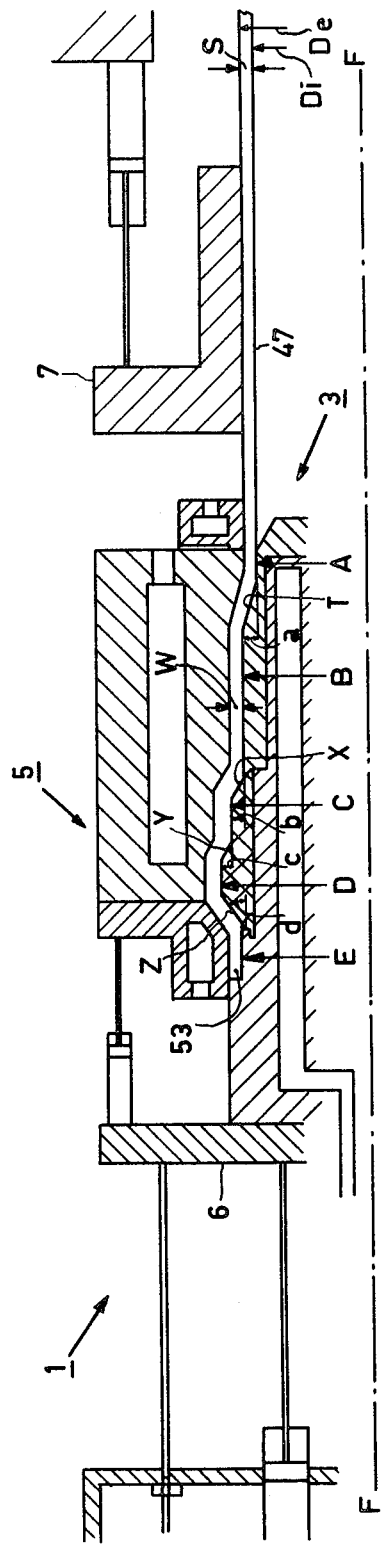

FIG. 3 shows the situation after completion of the upsetting operation. Subsequently, the heating medium circulating in the chambers 41, 43 and 45 is replaced by a cooled medium. After the shaping mandril and the shaping sleeve as well as the pipe end now converted into a bell end have cooled down sufficiently, the core portion 21 and the ring 29 are displaced to the left, the shaping ring 23 and the end portion 25 then remaining in the bell end. The elastic shaping ring 23 is removed from the bell end by hand or by means of a tool, after which the end portion 25 can also be removed. After the opening of the shaping cylinder 27, of the cooling ring 42 and of the pipe clamp 7, the bell end thus obtained can be removed from the device. After the shaping ring 23 and the end portion 25 have been secured again on the core portion 21 and after the pipe clamp 7 has been returned to the original axial position, and after the shaping portions have reached the desired temperature again, the device will be ready again for a further operation.

Figure 2:
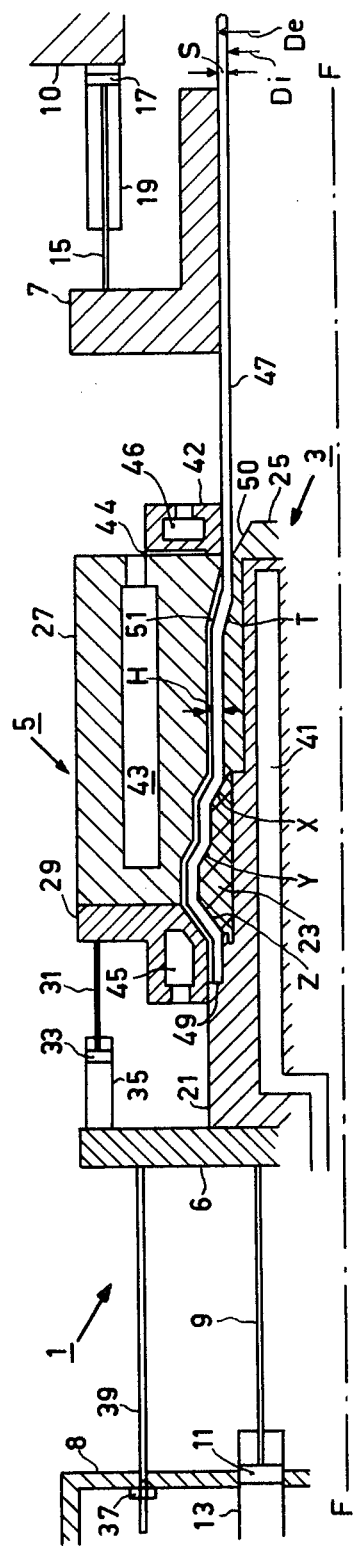
FIGS. 2 and 3 are longitudinal sectional views of the apparatus of FIG. 1 operating in the working position prior to and after upsetting of the pipe respectively.

In the closed position of the device shown in the FIGS. 2 and 3, the shaping mandril and the shaping sleeve are concentric relative to each other. The outer diameter of the shaping mandril 3 and the inner diameter of the shaping sleeve 5 vary, the diameter first increasing in three steps, and subsequently decreasing again in one step. The outer diameter A of the shaping mandril substantially equals the inner diameter $D_i$ of the pipe 47; the diameter B substantially the outer diameter $D_e$ of the pipe 47, and the diameter C has a value between the diameter B and a maximum diameter D. The diameter E at the bell end is substantially equal again to the outer diameter $D_e$ of the pipe.

The transition between successive cylindrical portions of different diameter is effected via conical transition portions T, X, Y, Z (FIG. 2) at an acute angle of inclination with respect to the center line F—F of the shaping mandril; the angle $a$ of the transition portion T equals 15°, the angle $b$ of the transition portion X equals 30°, the angle $c$ of the transition portion Y also equals 30°, and the angle $d$ of the transition portion Z equals 37.5°. The inner circumference of the shaping sleeve 5 is parallel to the outer circumference of the shaping mandril 3. The height H of the shaping space is minimum at the portion having the diameter A, and equals the thickness S of the pipe 47; at the portion having the diameter B the height H has been increased. The height has a maximum value at the portion having the diameter C, and is decreased again at the portions having the diameters D and E.

Figure 4:
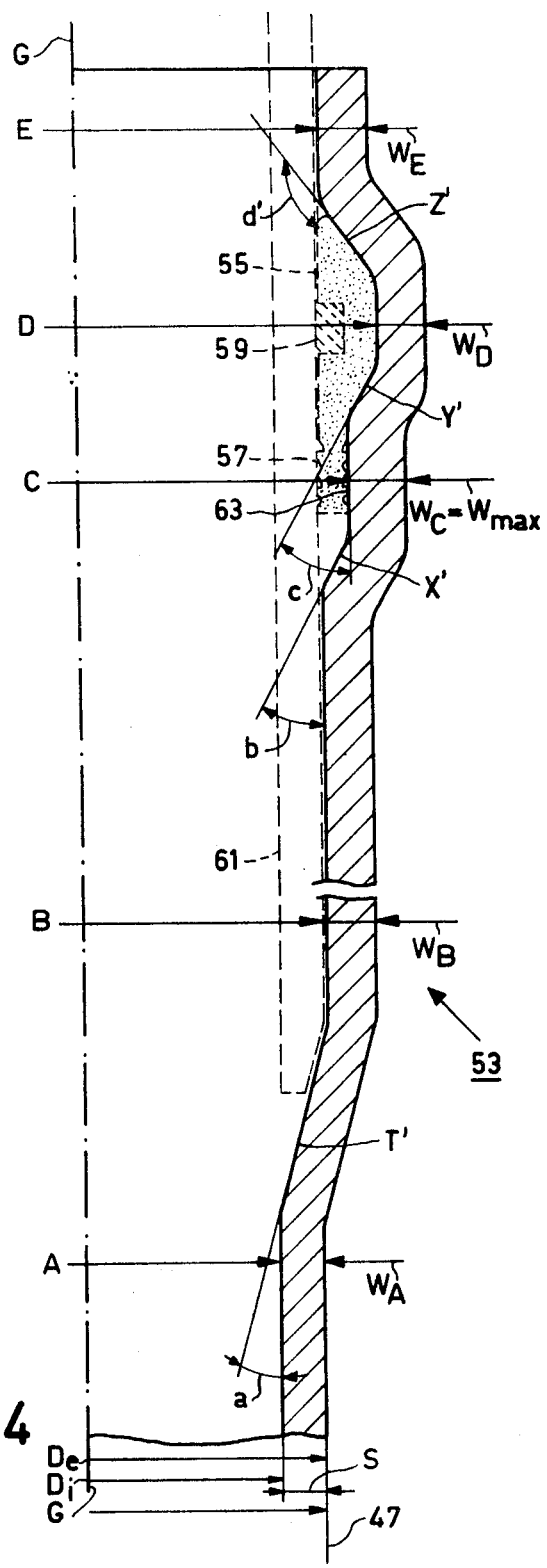
FIG. 4 is a sectional view at an increased scale of a pipe comprising a bell end shaped according to the invention.

In FIG. 4, the bell end 53 as formed by the apparatus 1 is shown at an increased scale. A sealing ring 55 provided with a sealing lip 57 is fixed inside the bell end by a retaining ring 59 at the area of the bell end portion having the maximum inner diameter D. The wedge end 61 of another pipe is shown (in broken lines) inserted into the bell end 53. The transition between successive bell end portions of different inner diameter is effected, in accordance with the already described profile of the shaping mandril, from the pipe 47 to the end of the bell end, via conical transition portions T', X', Y' and Z' which enclose an angle $a$ of 15°, an angle $b$ of 30°, an angle $c$ of 30° and an angle $d'$ of 142.5° and with the center line G—G of the bell end. In accordance with the variation of the height H of the shaping space, the wall thickness distribution W is such that $W_A < W_B < W_C > W_D > W_E$, the wall thickness $W_A$ being equal to the wall thickness S of the pipe. The bell end has a maximum wall thickness $W_c = W_{max}$ at the area of the sealing lip 57. The maximum wall thickness $W_{max}$ can increase to a given value which is 30% larger than the wall thickness S of the pipe, depending on the diameter C relative to $D_i$. The inner wall of this bell end portion also serves as the sealing face 63. At this most critical part, loaded not only by the internal pressure of the fluid in the pipe but also by the compressed sealing ring, the wall thickness is determined, as for the other bell end portions, such that a pressure resistance is obtained which at least equals the pressure resistance of the pipe wall.

The sealing ring of the type shown has excellent sealing properties and can be vary reliably secured in the sealing chamber. Moreover, the portion of maximum wall thickness of the bell end, also including the sealing face, is protected against damage during transport, storage and assembly by the adjoining bell end portion of maximum diameter.

We claim:

1. An apparatus for forming a bell end in a pipe of thermoplastic material, comprising a mandril which is symmetrical about an axis and has a metal core with a pipe clamp end and a bell end portion and an elastic shaping ring around said core between said end and end portion, a shaping sleeve, pipe clamp, and an upsetting member; means for mounting and positioning said mandril, shaping sleeve, pipe clamp and upsetting member coaxially with respect to one another and for relative axial movement, in an operating position the mandril and shaping sleeve being concentrically arranged and bounding an annular shaping space between outer diameters of the mandril and inner diameters of the shaping sleeve, said outer and inner respective diameters increasing along conical transition portions between cylindrical steps, from the pipe clamp end of the shaping mandril to a sealing chamber portion of the annular shaping space, and decreasing again to the bell end portion, the height of the shaping space increasing from the pipe clamp end of the shaping mandril to a surface in the sealing chamber and decreasing again.

2. An apparatus as claimed in claim 1, wherein said elastic shaping ring comprises conical transition portions adjoining the core portion, the transition portions to the pipe clamp end and to the bell end portion extending at angles of less than 45° and less than 60°, respectively, with respect to the axis, and two cylindrical surfaces of different diameters, the surface closer to the pipe clamp end mandril having the smaller diameter, the height of the annular chamber being greatest above the smaller cylindrical surface of the shaping ring.

3. An apparatus as claimed in claim 2, wherein the height of the annular space at the area of greatest height exceeds at the most 30% of the height of the shaping space at the area of the pipe clamp end of the mandril, and wherein said upsetting member is formed by an annular radial abutment face at the bell end portion of the mandril.

4. An apparatus as claimed in claim 3, comprising in addition a cooling ring connected to an end of the shaping sleeve directed toward the pipe clamp.

* * * * *